(12) United States Patent
Calvin (10) Patent No.: US 11,149,921 B2
(45) Date of Patent: Oct. 19, 2021

(54) AIRCRAFT LIGHT COLLIMATION AND REDIRECTION APPARATUS AND METHOD

(71) Applicant: AeroLEDS, LLC, Boise, ID (US)

(72) Inventor: Nathan Howard Calvin, Boise, ID (US)

(*) Notice: Subject to any disclaimer, the term of this patent is extended or adjusted under 35 U.S.C. 154(b) by 115 days.

(21) Appl. No.: 16/826,695

(22) Filed: Mar. 23, 2020

(65) Prior Publication Data

US 2021/0293395 A1     Sep. 23, 2021

(51) Int. Cl.
| | | |
|---|---|---|
| *F21V 5/04* | (2006.01) | |
| *F21V 13/04* | (2006.01) | |
| *B64D 45/00* | (2006.01) | |
| *B64D 47/02* | (2006.01) | |

(52) U.S. Cl.
CPC .............. *F21V 5/04* (2013.01); *B64D 45/00* (2013.01); *B64D 47/02* (2013.01); *F21V 13/04* (2013.01); *B64D 2203/00* (2013.01)

(58) Field of Classification Search
CPC ........ B64D 45/00; B64D 47/02; B64D 47/04; B64D 47/06; B64D 2203/00; F21V 5/04; F21V 5/043; F21V 5/045; F21V 13/04; F21V 13/12
See application file for complete search history.

(56) References Cited

U.S. PATENT DOCUMENTS 9,777,903 B2 * 10/2017 Jha .................... B64D 47/02

\* cited by examiner

*Primary Examiner* — Jason M Han
(74) *Attorney, Agent, or Firm* — Williams Intellectual Property; Benjamin F. Williams (57) ABSTRACT

An aircraft light collimation and redirection apparatus and method devised to reflect, refract, focus, and collimate light from a light source along particular steradians relative to an aircraft to maximize the perceived luminous intensity at all statutorily required angles of observation while minimizing the required luminous efficacy of the light source.

14 Claims, 12 Drawing Sheets

AIRCRAFT LIGHT COLLIMATION AND REDIRECTION APPARATUS AND METHOD

BACKGROUND OF THE INVENTION

External aircraft lights are statutorily required to render an aircraft visible to observers, to denote the position and orientation of the aircraft, and to assist the pilot in observation of the vicinity while flying and operating the aircraft. Title 14 of the Code of Federal Regulations, Aeronautics and Space, is the body of rules and regulations that implements the Federal requirements ("14 C.F.R."). Aircraft classes are taken herein is according to the SAE International definitions: Class I aircraft, rotorcraft; Class II aircraft, fixed wing aircraft; and Class III aircraft, fixed wing and rotorcraft.

Aircraft lighting regulations require approved anti-collision and position light systems for low visibility operations. 14 C.F.R. § 91.209. Position and anti-collision lights are required to assist in preventing collisions between aircraft, to reduce pilot error in low visibility conditions, and enable observational awareness by onlookers and witnesses.

External aircraft lighting systems are broadly defined in two categories for the purposes of the rules: position lights and anti-collision lights. Position lights consist of a consistently illuminated Aviation Red on the left side of the aircraft, Aviation Green on the right side of the aircraft, and an Aviation White at the aft of the aircraft. 14 C.F.R. § 23.2530. Position lights are required to be spaced as far apart as practicable and are therefore typically located on the aircraft wingtips and tail. Id. Any position and anti-collision lights must have the intensities, flash rate, colors, fields of coverage, and other characteristics that provide sufficient time for another aircraft to avoid a collision. Id. Each position light intensity must equal or exceed the applicable values in the following Tables 1 and 2 below:

TABLE 1

Minimum Intensities in the Horizontal Plane of Forward and Rear Position Lights. 14 C.F.R. §§ 29.1391; 27.1391; 25.1391.

| Angle from right or left of longitudinal axis, measured from dead ahead | Intensity (candles) | | |
|---|---|---|---|
| | Class I | Class II | Class III |
| L and R (forward red and green) | | | |
| 10° to 10° | 40 | 40 | 40 |
| 10° to 20° | 30 | 30 | 30 |
| 20° to 110° | 5 | 5 | 5 |
| A (rear white) | | | |
| 110° to 180° | 20 | 20 | 20 |

TABLE 2

Minimum Intensities in any Vertical Plane of Forward and Rear Position Lights. 14 C.F.R. §§ 29.1393; 27.1393; 25.1393.

| Angle Above or Below Horizontal Plane | Intensity, I | | |
|---|---|---|---|
| | Class I | Class II | Class III |
| 0° | 1.00 | 1.00 | 1.00 |
| 0° to 5° | 0.90 | 0.90 | 0.90 |
| 5° to 10° | 0.80 | 0.80 | 0.80 |
| 10° to 15° | 0.7 | 0.7 | 0.7 |
| 15° to 20° | 0.5 | 0.5 | 0.5 |

TABLE 2-continued

Minimum Intensities in any Vertical Plane of Forward and Rear Position Lights. 14 C.F.R. §§ 29.1393; 27.1393; 25.1393.

| Angle Above or Below Horizontal Plane | Intensity, I | | |
|---|---|---|---|
| | Class I | Class II | Class III |
| 20° to 30° | 0.3 | 0.3 | 0.3 |
| 30° to 40° | 0.1 | 0.1 | 0.1 |
| 40° to 90° | 0.05 | 0.05 | 0.05 |

Anti-collision lights are preferentially emitted within a horizontal plane, to limit vertical divergence, but must have enough intensity to illuminate the vital areas around the aircraft in the horizontal plane relative the aircraft to at least 30° above and 30° below the aircraft. 14 C.F.R. § 29.1401 (b). Larger aircraft require a minimum intensity up to 75° above and below the aircraft. 14 C.F.R. § 25.1401(b). Minimum intensities for anti-collision lights must equal or exceed the levels indicated in the Table 3 below, at the associated angle of observation:

TABLE 3

Minimum Effective Intensities for Anti-Collision Light. 14 C.F.R. §§ 29.1401(f); 27.1401(f); 25.1401(f).

| Angle Above or Below Horizontal Plane | Effective Intensity (candles) | | |
|---|---|---|---|
| | Class I | Class II | Class III |
| 0° to 5° | 150 | 400 | 100 |
| 5° to 10° | 90 | 240 | 60 |
| 10° to 20° | 30 | 80 | 20 |
| 20° to 30° | 15 | 40 | 10 |
| 30° to 75° | — | 20 | — |

This minimum effective intensity in the vertical plane, measured with a red filter (if used), is expressed in the following relation, which must be assumed (14 C.F.R. § 29.1401(e)):

$$I_e = \frac{\int_{t_1}^{t_2} I(t)dt}{0.2 + (t_2 - t_1)}$$

where:
$I_e$=effective intensity (candles)
$I(t)$=instantaneous intensity as a function of time
$t_2-t_1$=flash time interval (seconds)

Anti-collision lights are typically strobed, and flash to the given intensity between 40 and 100 times per minute. 14 C.F.R. § 29.1401(c).

The present invention has been devised to meet or exceed the Federally mandated requirements for visibility in anti-collision lighting systems, as set forth presently or as may be enumerated in the future, while minimizing the amount of power needed to operate the lights. The present invention has been devised to collimate and direct light through an optic comprising a plurality of collimators configured to direct light via particular steradians along observation angles that effectively meet or exceed the above requirements, while minimizing divergence into steradians where illumination is not required, thereby reducing unneeded emission and enabling lesser output to meet the required standards for intensity. The present invention consequently reduces electrical demand and the amount of heat produced, which in turn increases the longevity and operability of the light source.

FIELD OF THE INVENTION

The present invention relates generally to aircraft warning, position, and navigation lights, and more particularly to an aircraft light collimation and redirection apparatus and method that maximizes the visibility of an aircraft from all statutorily required angles of observation required for anti-collision lighting systems, while minimizing the intensity of light required to be output to meet the said standards of visibility. The present invention, therefore, presents an optimally efficient aircraft anti-collision strobe ("ACS"), devised to focus luminous emittance within particular steradians to produce the necessary luminance at the desired points of observation while minimizing the power demand of the light source.

SUMMARY OF THE INVENTION

The present aircraft light collimation and redirection apparatus and method enables direction of light along specific steradians from an aircraft anti-collision strobe, to maximize visibility while minimizing the amount of power required to create the luminous intensity that meets or exceeds Federal aviation anti-collision lighting standards along all required angles of observation.

The present aircraft light collimation and redirection apparatus and method employs a novel optic, disposed covering at least one light source, that comprises a plurality of collimators that collimate light from the light source along particular steradians accordant with meeting or exceeding the Federal requirements for anti-collision intensity at all required angles of observation.

The term "collimate," as used herein throughout, is taken according to its ordinary meaning in the optical arts, but may also include additional meanings such as directing, focusing, condensing, concentrating, refracting, reflecting, scattering, diffusing, deflecting, diffracting, decollimating and recollimating, and all other means by which light rays may be directed and redirected into parallel pathways through an optic.

The term "collimator," as used herein throughout, is taken according to its ordinary meaning in the optical arts but may also include the additional meaning of a course, surface, structure, or aperture through which a pathway of light is directable in a given direction, or wherein a light ray is caused to change direction.

The term "lenticle" is taken according to its ordinary meaning in the optical arts but may also include the additional meaning of any structure or surface within a collimator (as defined above) that functions to redirect a light ray from at least a first direction to at least a second direction.

The term "coronal plane," as used herein throughout, is taken to mean the horizontal plane relative an aircraft; that is, the plane coextensive with the wingspan of the aircraft. The "sagittal plane," as used herein throughout, is taken to mean the vertical plane relative an aircraft that is coextensive with the longitudinal axis of the aircraft, from nose to tail. The term "transverse plane," as used herein throughout, is taken to mean the vertical plane normal the sagittal plane and the coronal plane; that is a vertical plane that is normal to the longitudinal axis of the aircraft.

The present aircraft light collimation and redirection apparatus, therefore, includes an optic that is configured to seat over a light source to present a plurality of collimators that direct and control visible radiation along certain pathways to increase luminance at corresponding points of observation while minimizing the luminous efficacy of the light source required to produce such luminance. The present invention, therefore, reduces the power demand of the light source, reduces waste heat produced by the light source, and therefore increases the operable life of the light source while maximizing the luminous intensity at all required points of observation.

In an example embodiment set forth herein, the light source comprises a linear arrangement of a plurality of Light Emitting Diodes ("LEDs") disposed upon a base. The optic seats over each of the plurality of LEDs, to encapsulate each LED interior to an associated collimator. Each collimator includes at least one lenticle that redirects the pathways of light collimated in at least one direction. Thus, the lambertain radiation pattern typical of the luminescence produced by an LED is directed or redirected through the particular collimator to focus and collimate the light along at least one particular steradian. The luminance (candela per squaremeter) is therefore increased along the said at least one particular steradian without increasing the luminous efficacy (lumen per watt) of each particular LED.

In an example embodiment contemplated herein, six LEDs are disposed linearly upon the base. The optic includes a first collimator, a second collimator, and a third collimator, each devised to manipulate the pathways of light interior thereto in different ways. These first, second, and third collimators each seat over an associated LED. A fourth, fifth, and sixth collimator is disposed in mirror-image to each of the respective third, second, and first collimators, and therefore seats over the remaining LEDs. Each of the six LEDs is therefore disposed interior to a collimator, three of which collimate light into one quadrant ($\pi r.sr$) of the surrounding space, and three of which, disposed in mirror-image relative the first three, collimate light into an opposite quadrant ($\pi r.sr$) of the surrounding space.

In this example embodiment, the first collimator includes at least one lenticle adapted to direct light in at least a first direction, collimated in a path normal the base. The second collimator includes at least one lenticle adapted to direct light in at least a second direction, angled relative the first direction. The third collimator includes at least one lenticle adapted to direct light in at least a third direction parallel to the light source, as well as in the first direction and in the second direction. The fourth collimator is disposed adjacent to and as a mirror-image of the third collimator. The fifth collimator is disposed adjacent to the fourth collimator and is disposed as a mirror-image of the second collimator, and the sixth collimator is disposed adjacent to the fifth collimator as a mirror-image of the first collimator.

A heat sink is disposed upon and around the base to conduct heat away from the plurality of LEDs and the optic. A translucent lens cap is disposed to enclose the optic and includes a lenticular portion devised to focus and magnify light directed therethrough from the optic. The heat sink includes a base drain, devised to conduct heat away from the LEDs through the base, and a surrounding portion that seats around the base of the lens cap where the lens cap connects to the base. An interior surface of the surrounding portion may further assist in reflecting and/or focusing light through the optic and includes apertures at a front and rear extreme to enable passage of light therethrough anteriorly and rearwardly from position and navigation lights exteriorly situated relative to the optic.

Luminous intensity and luminous energy density are therefore increased along particular steradians accordant with angles of observation required by statute, while the luminous efficacy (lumens per Watt) of each LED required to meet said standard of luminous intensity is minimized.

Thus, has been broadly outlined the more important features of the present aircraft light collimation and redirection apparatus and method so that the detailed description thereof that follows may be better understood and in order that the present contribution to the art may be better appreciated.

Objects of the present aircraft light collimation and redirection apparatus and method, along with various novel features that characterize the invention are particularly pointed out in the claims forming a part of this disclosure. For better understanding of the aircraft light collimation and redirection apparatus and method, its operating advantages and specific objects attained by its uses, refer to the accompanying drawings and description.

BRIEF DESCRIPTION OF THE DRAWINGS

Figures

DETAILED DESCRIPTION OF THE DRAWINGS

With reference now to the drawings, and in particular FIGS. 1 through 12 thereof, example of the instant aircraft light collimation and redirection apparatus and method employing the principles and concepts of the present aircraft light collimation and redirection apparatus and method and generally designated by the reference number 10 will be described.

Referring to FIGS. 1 through 12 a preferred embodiment of the present aircraft light collimation and redirection apparatus and method 10 is illustrated.

Figure 1:
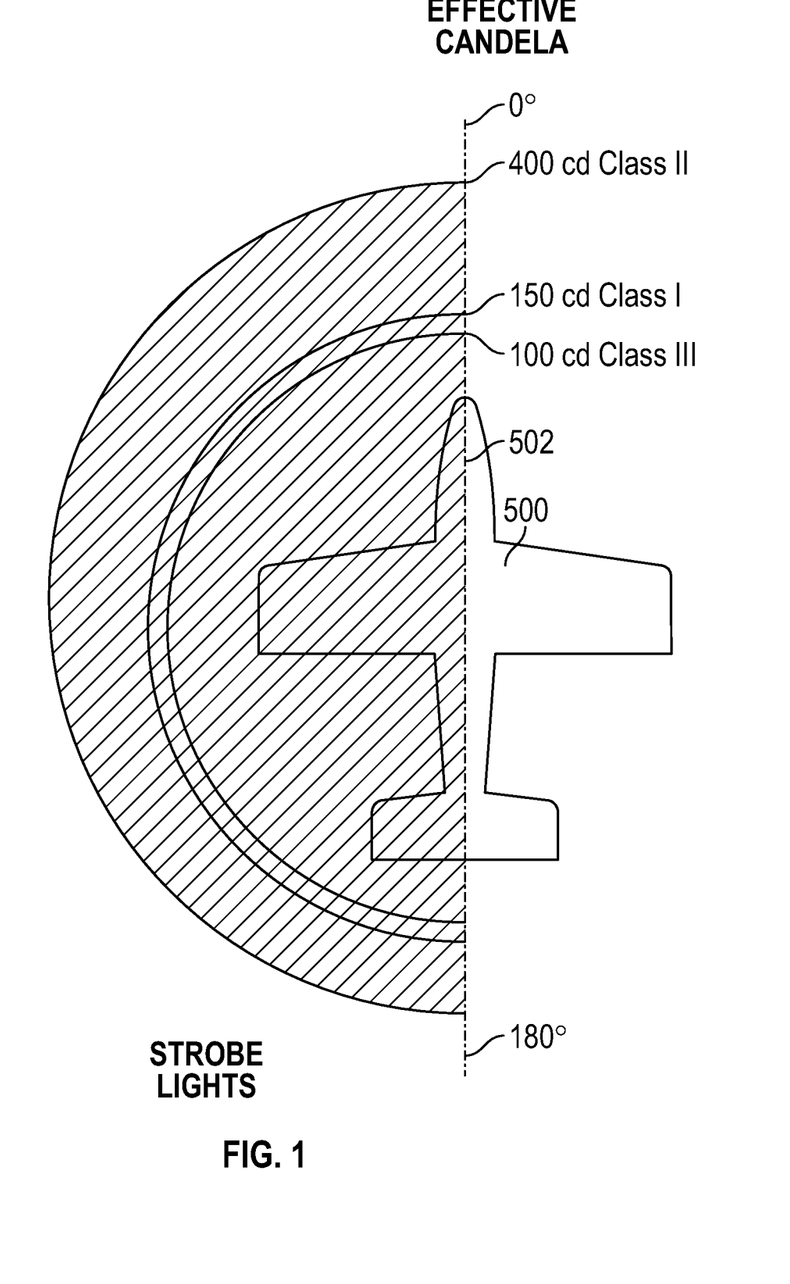
FIG. 1 is a pictorial summary of the light pattern required for anti-collision strobe lights observed in the horizontal (coronal) plane relative Class I, II, and III aircraft.

FIG. 1 illustrates a pictorial summary of the light pattern required for anti-collision strobe lighting systems ("ACS") relative aircraft 500. Major axis 502 of aircraft 500 runs from 0° to 180°, nose to tail. The pattern of FIG. 1 is in the horizontal plane. The minimum effective luminous intensity of the ACS from 0° to 180° is 150 candela ("cd") for Class I and II aircraft and 400 cd for Class III aircraft.

Figure 2:
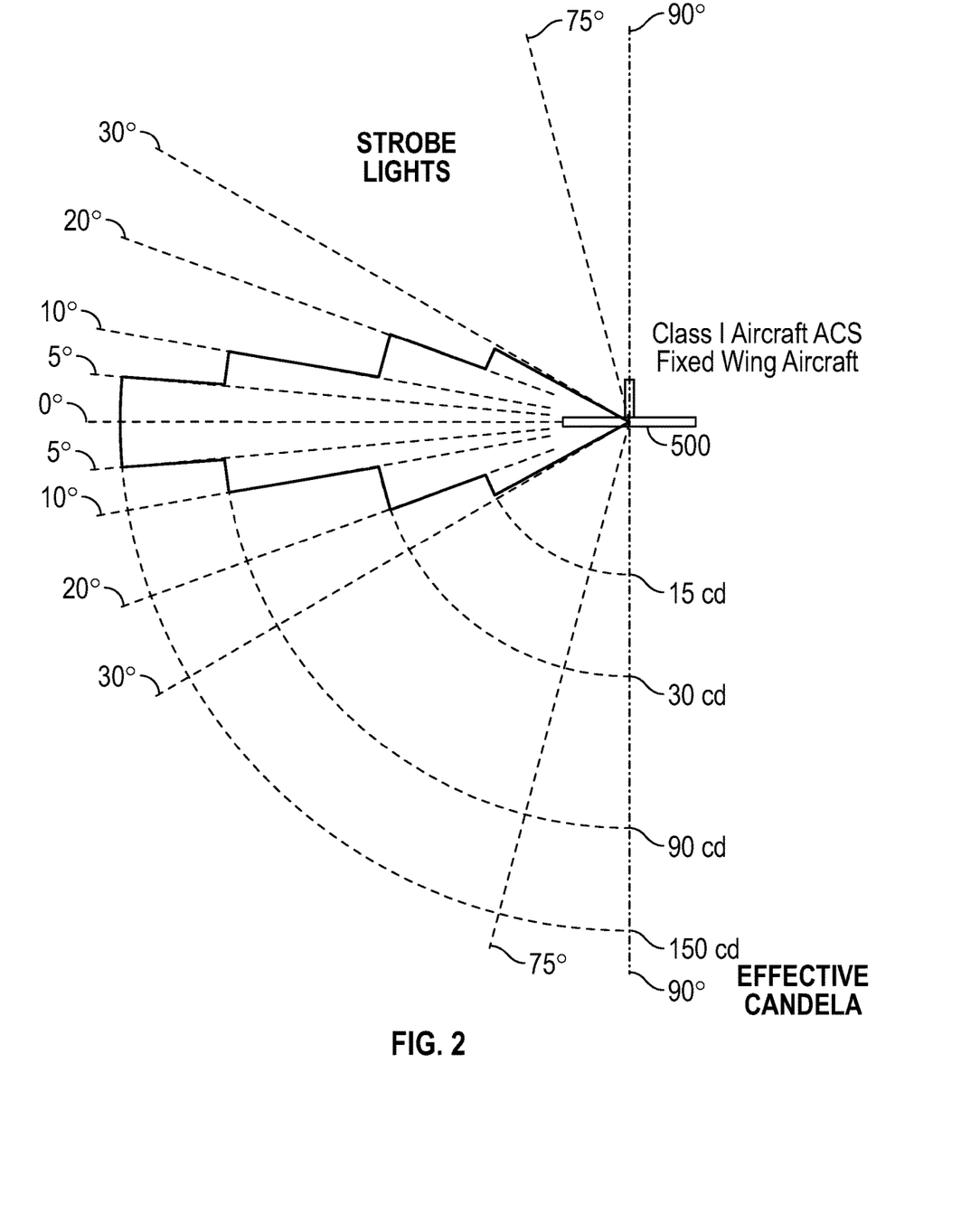
FIG. 2 is a pictorial summary of the light pattern required for anti-collision strobe lights observed in the vertical plane (transverse and sagittal planes) relative Class I aircraft (rotorcraft)

FIG. 2 illustrates a pictorial summary of the light pattern required for ACS relative a Class I aircraft above and below the horizontal plane. The vertical plane is perpendicular to major axis 502 of aircraft 500. The minimum luminous intensity of the ACS is a minimum of 150 effective candela form 0° to 5°, 90 effective candela from 5° to 10°, 30 effective candela from 10° to 20°, and 15 effective candela from 20° to 30°.

Figure 3:
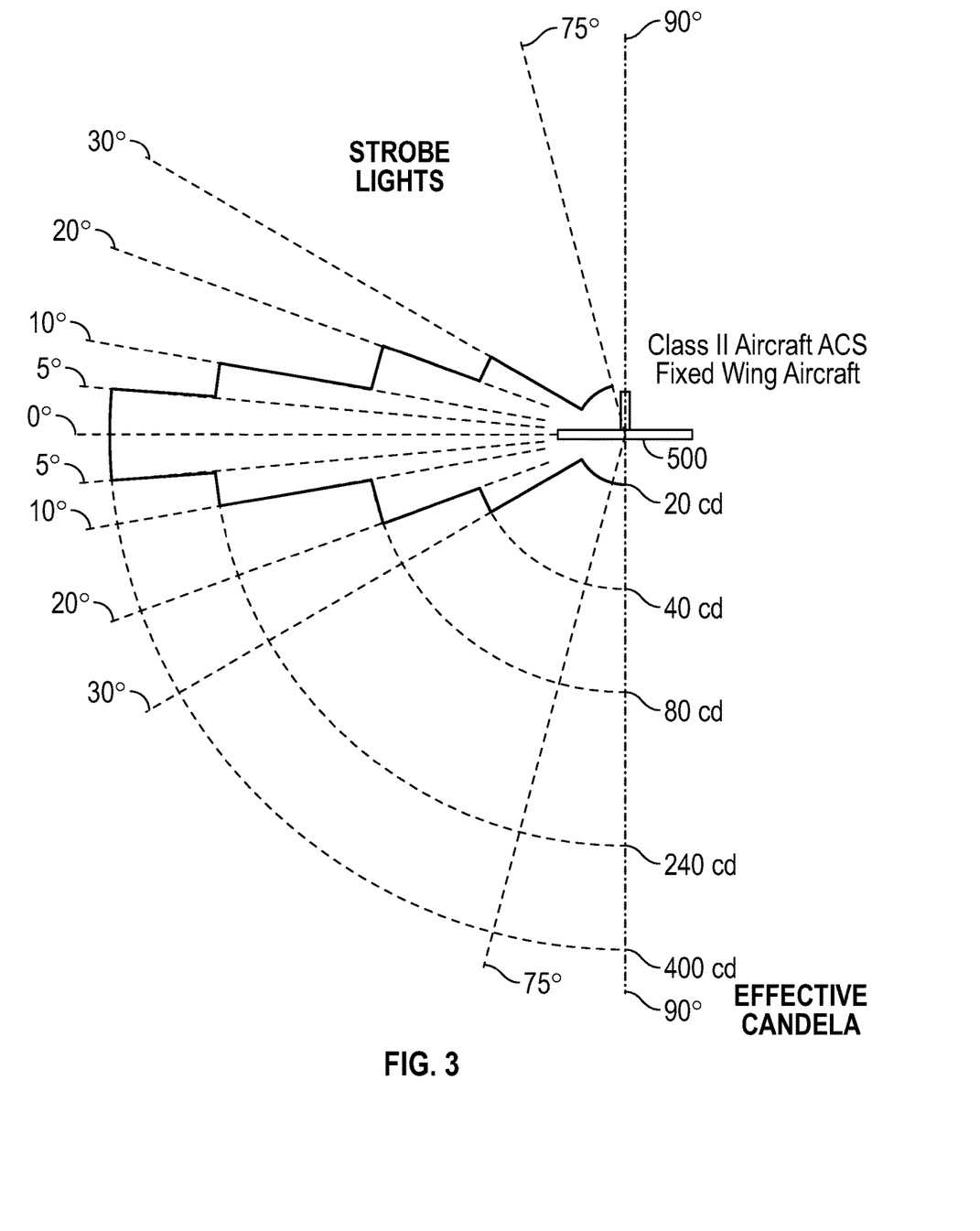
FIG. 3 is a pictorial summary of the light pattern required for anti-collision strobe lights observed in the vertical plane (transverse and sagittal planes) relative Class II aircraft (fixed wing aircraft).

FIG. 3 illustrates a pictorial summary of the light pattern required for ACS relative a Class II aircraft above and below the horizontal plane. The vertical plane is perpendicular to major axis 502 of aircraft 500. The minimum luminous intensity of the ACS is a minimum of 400 effective candela form 0° to 5°, 240 effective candela from 5° to 10°, 80 effective candela from 10° to 20°, 40 effective candela from 20° to 30°, and 20 effective candela from 30° to 75°.

Figure 4:
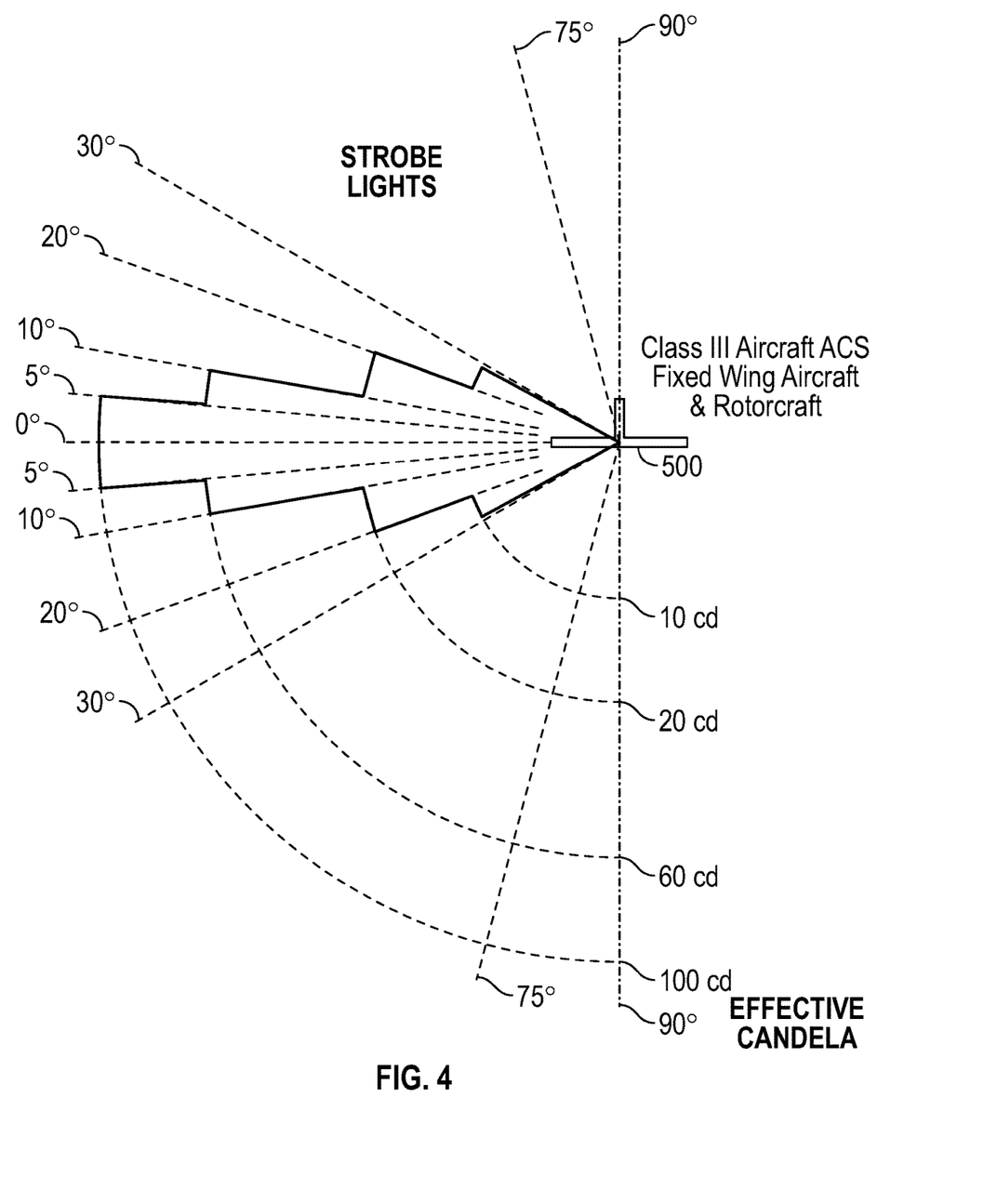
FIG. 4 is a pictorial summary of the light pattern required for anti-collision strobe lights observed in the vertical plane (transverse and sagittal planes) relative Class III aircraft (fixed wing and rotorcraft).

FIG. 4 illustrates a pictorial summary of the light pattern required for ACS relative a Class III aircraft above and below the horizontal plane. The vertical plane is perpendicular to major axis 502 of aircraft 500. The minimum luminous intensity of the ACS is a minimum of 100 effective candela form 0° to 5°, 60 effective candela from 5° to 10°, 20 effective candela from 10° to 20°, and 10 effective candela from 20° to 30°.

The present invention meets or exceeds the above luminous intensity requirements for ACS, from all required angles of observation, for all classes of aircraft. It should be noted that the example embodiments set forth hereinbelow are not meant as limiting examples but are provided for exemplification purposes only. The below embodiments are presented to illustrate implementations of the present invention applicable across all classes of aircraft. To apply specifically to a Class I, II, or III aircraft, and to meet the separate standards each Class requires, the luminous intensity of the emitters disclosed hereinbelow, particularly with references to FIGS. 5 through 8, may be readily increased or decreased, as case may be, by altering the associated luminous efficacy of the emitters themselves, as necessary to meet the Class requirements, without necessarily altering the overall metes and bounds of the intended scope of the invention as expressed and set forth herein. Thus, various embodiments contemplated may be implemented to a particular aircraft by altering the luminous efficacy of the emitters themselves without altering the overall scope of the inventive step. The optic disclosed hereinbelow is further contemplated to be adaptable and scalable to meet the statutory standards required for luminous intensity at all angles of observation relative any particular aircraft.

Figure 5A:
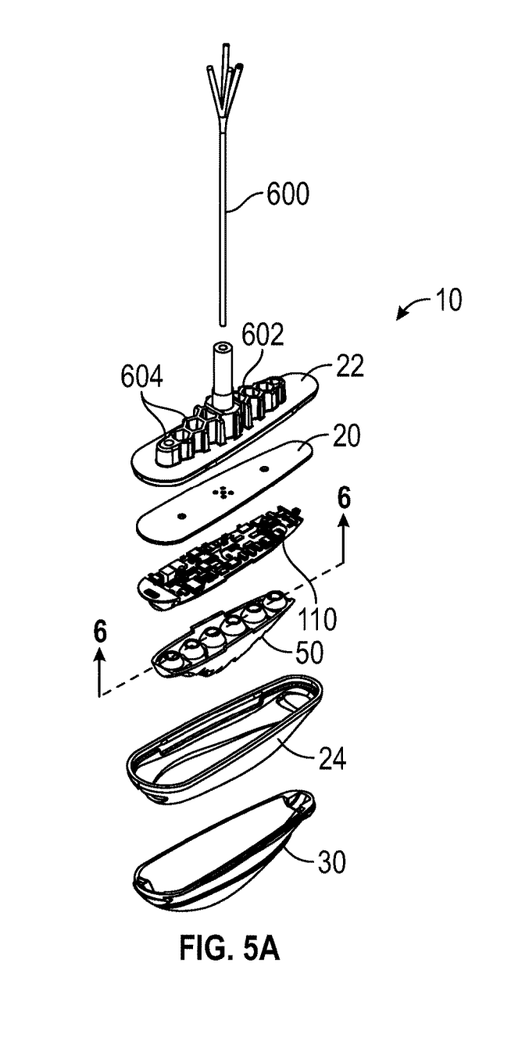
FIGS. 5A and 5B are elevation exploded views of an example embodiment of the present apparatus.
Figure 5B:
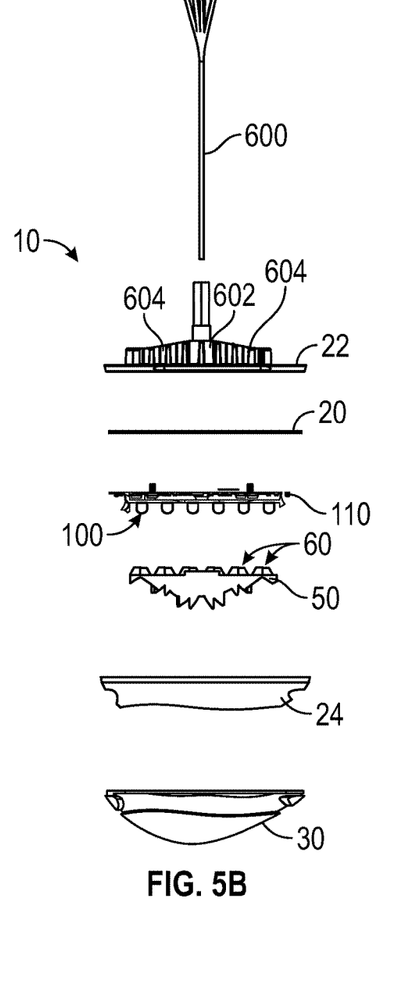

Therefore, FIGS. 5A and 5B illustrate an exploded view of an example embodiment of apparatus 10. In this example embodiment shown, a series of six LEDs 100 is disposed on base 20 and mounted atop heat sinking base drain 22 which is devised to conduct heat away from base 20 and secure the apparatus 10 to an aircraft. Base drain 600 includes heat conduction channels 604. Wiring 600 connects with light source 110 through base drain 22 main aperture 602 and feeds power to light source 110 and plurality of LEDs 100. Optic 50 seats overtop LEDs 100 such that at least one LED is encapsulated in each of plurality of collimators 60. Translucent lens cap 30 attaches overtop base 20 to enclose optic 50. Surrounding portion 24 of heat sink is devised to conduct heat away from the plurality of LEDs 100 and, in some embodiments, to direct light upwardly as well as through anterior aperture 26 and posterior aperture 28. In this example embodiment, anterior and posterior apertures 26, 28 are devised to channel light from position and/or navigation lights that are not encapsulated in optic 50. Heat sink surrounding portion 24 may include a reflective interior surface (not shown) configured to reflect light back into optic 50.

Figure 6:
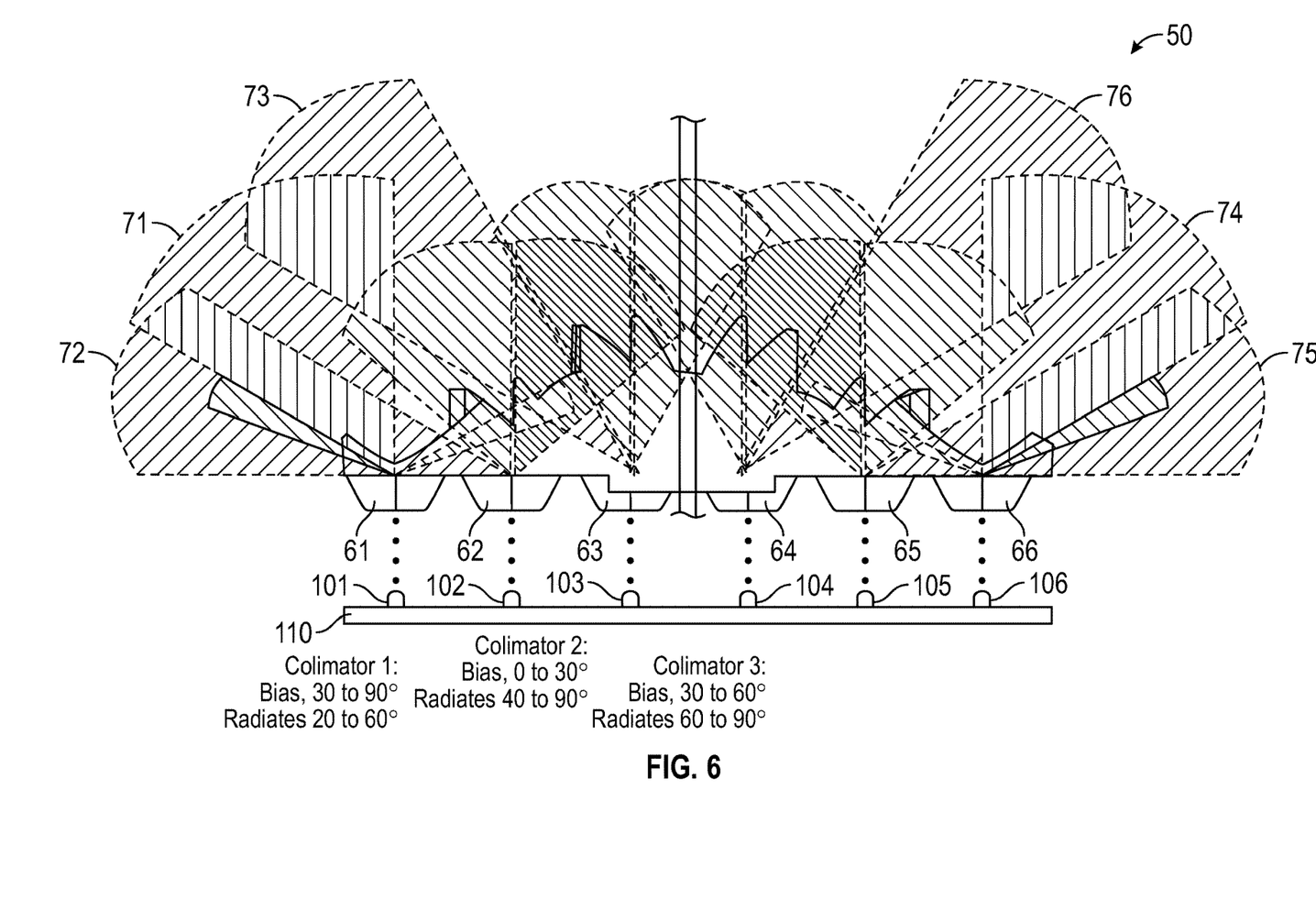
FIG. 6 is a cross section view of an example embodiment of an optic taken along the line A-A of FIG. 5A

FIG. 6 illustrates a cross-section view of an example embodiment of optic 50 and a simplified depiction of the light paths that each of the plurality of collimators 60 is configured to produce. In this example embodiment, optic 50 includes six collimators disposed to seat over six associated LEDs. Fourth, fifth, and sixth collimators 64, 65, 66 are mirror-images of third, second, and first collimators 61, 62, 63 respectively, and therefore direct and redirect light in mirror-image to light directed and redirected through first, second, and third collimators 61, 62, 63.

First collimator 61 is adapted to focus and collimate light into beam 71, effectively focusing, directing, and collimating light along at least one steradian from 60° to 90° relative to the source LED 101. Note that first collimator 61 still allows for divergence from 20° to 60° and from 120° to 160°, but that the collimated and focused beam 71 is biased in the range of 60° to 90° relative to the source LED 100. Luminance is therefore increased as light is focused into beam 71.

Second collimator 62 is adapted to focus and collimate light into beam 72, effectively focusing, directing, and collimating light along at least one steradian from 0° to 30° relative to the source LED 102. Note that second collimator 62 still allows for divergence from 40° to 90° and from 90° to 130°, but that the collimated and focused beam is biased in the range of 0° to 30° relative to the source LED 102. Luminance is therefore increased as light is focused into beam 72. Note further that beam 72 overlaps and augments beam 71 from first collimator 61 and that divergent luminance overlaps and augments diverted luminance radiating from first collimator 61.

Third collimator 63 is adapted to focus and collimate light into beam 73, effectively focusing, directing, and collimating light along at least one steradian from 30° to 60° relative to the source LED 103. Note that third collimator 63 still allows for divergence from 60° to 90° and from 90° to 120°, but that the collimated and focused beam 73 is biased in the range of 30° to 60° relative to the source LED 103. Luminance is therefore increased as light is focused into beam 73. Note further that divergent luminance overlaps and augments diverted luminance radiating from first collimator 61 and second collimator 62. Fourth, fifth, and sixth collimators 64, 65, 66, operate to focus and collimate light in mirror-image to third, second, and first collimators 61, 62, 63, whereby the associated light paths are equivalent to those already described, but projected in mirror-image relative thereto, and enumerated in FIG. 6 as beams 74, 75, and 76. Thus, steradians from 0° to 90° are illuminated in the horizontal and vertical planes relative the aircraft, as required to meet or exceed statutory requirements.

Figure 7:
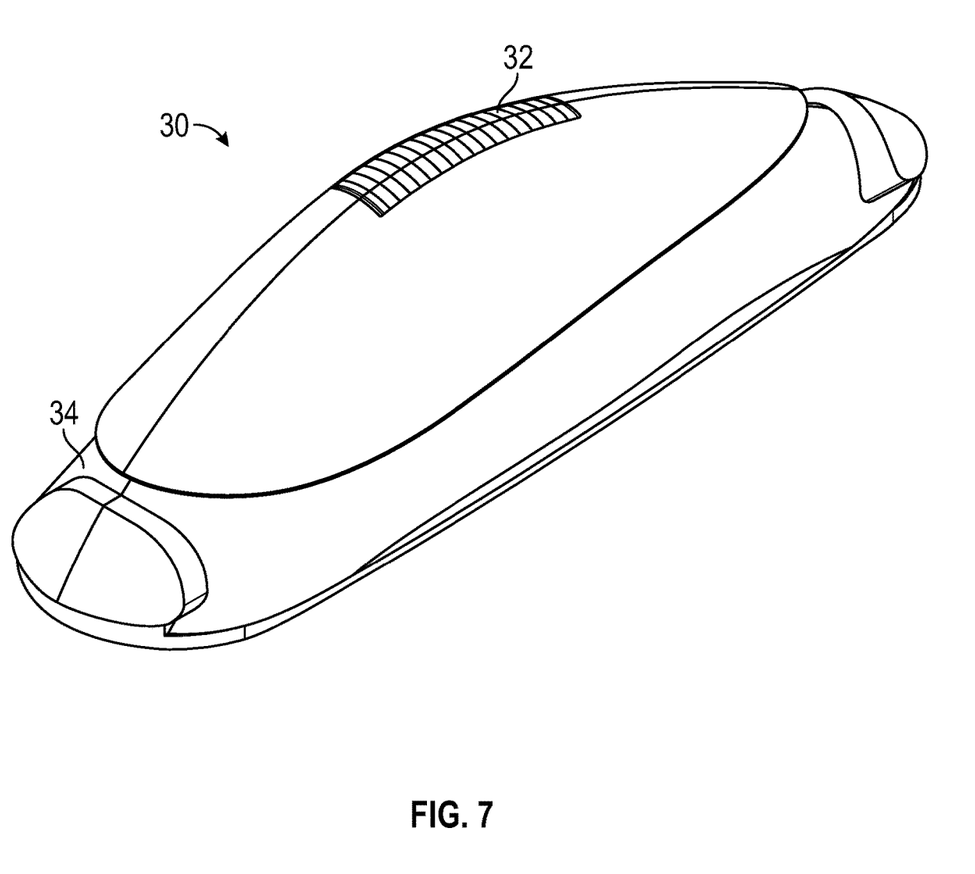
FIG. 7 is an elevation view of an example embodiment of a lens cap.

FIG. 7 illustrates an elevation view of lens cap 30. In this example embodiment, lens cap 30 is aerodynamically shaped to reduce drag and includes lenticulate lens portion 32 configured to focus and magnify light emitted therethrough. Lens cap 30 seats around and securely fastens to base 20 to encapsulate the light source and optic 50 therein. Recessed exterior portion 34 is configured to accommodate and secure seating of heat sink surrounding portion 24 therein.

Figure 8:
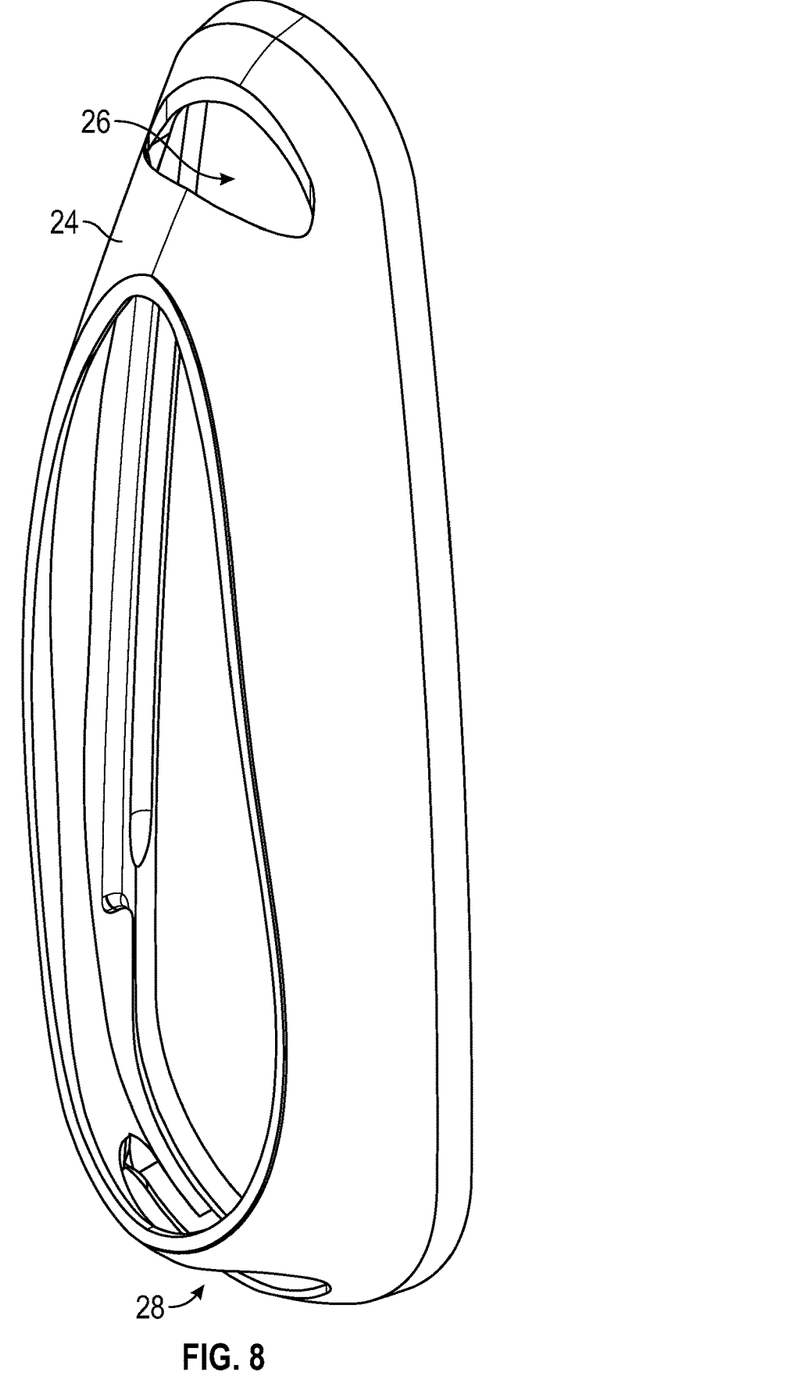
FIG. 8 is an elevation view of an example embodiment of a heat shield surrounding portion.

FIG. 8 illustrates an elevation view of heat sink surrounding portion 24 that secures into recessed exterior portion 34 to conduct heat away from the light source during use of the apparatus 10. Anterior aperture 26 and posterior aperture 28 enable transmission of light from position lights not encapsulated in optic 50.

Figure 9:
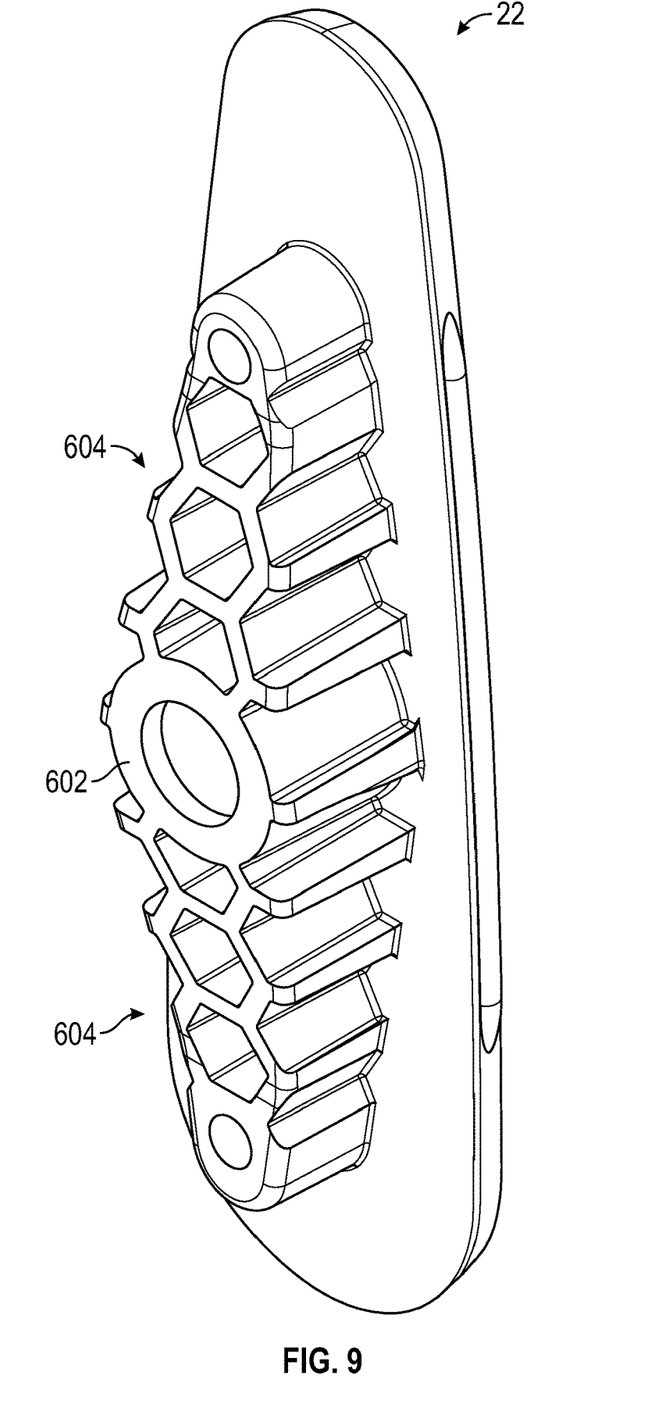
FIG. 9 is an elevation view of an example embodiment of a heat shield base drain.

FIG. 9 illustrates an elevation view of heat sink base drain 22 devised to connect with base 20 and conduct heat from base 20 during use of the apparatus 10.

Figure 10:
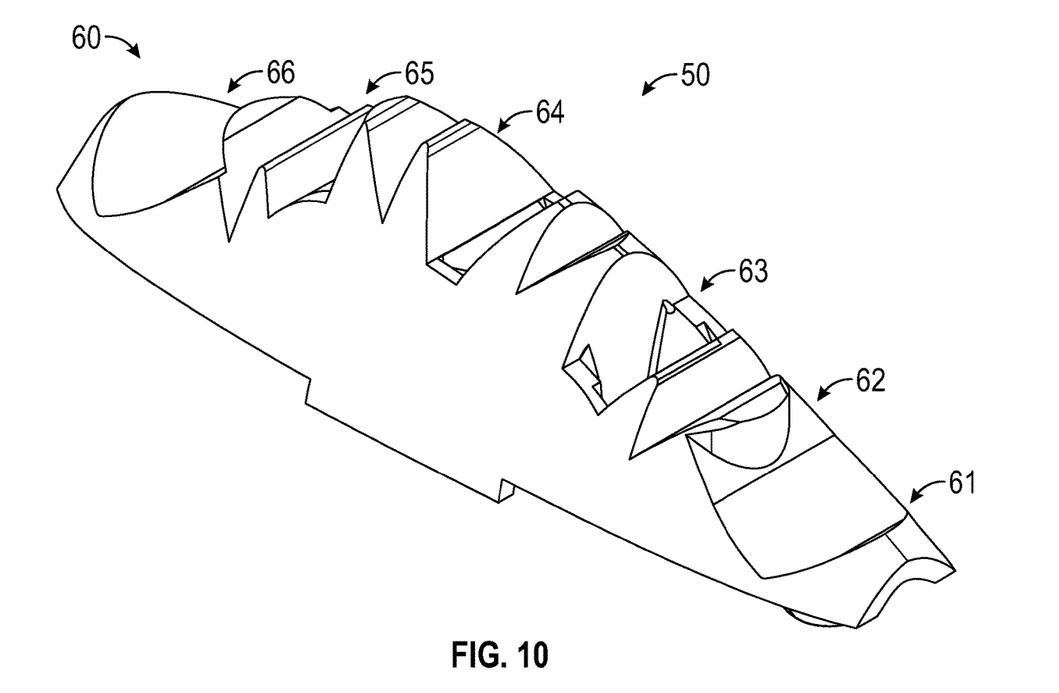
FIG. 10 is an example embodiment of an optic.

FIG. 10 is an elevation view of optic 50. Plurality of collimators 60 include first 61, second 62, third 63, fourth 64, fifth 65, and sixth 66 collimators which are configured to direct light as shown in FIG. 6 above. In this example embodiment, optic 50 is manufactured of a translucent liquid silicone rubber, a lightweight translucent material readily adaptable for the configuration shown. Additional substances are contemplated as sufficient for optic 50, including other translucent polymers, acrylics, polycarbonates, or even crystalline structures such as glass, or any other substance capable of reflecting or refracting light therethrough suitable for configuration as a plurality of collimators comprising lenticles therein.

Figure 11:
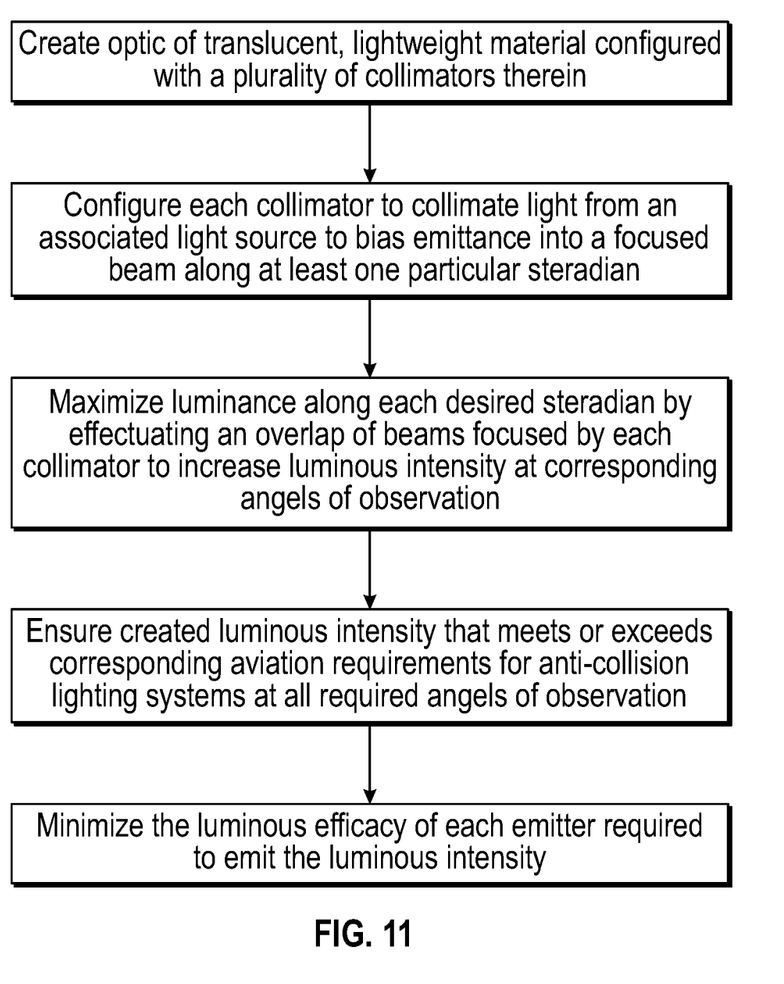
FIG. 11 is a flow diagram view of the steps informing the present method.

FIG. 11 illustrates a flow diagram of a method of increasing luminous intensity along particular steradians by focusing and collimating light along designated light paths to maximize visibility relative to the corresponding luminous efficacy of any particular emitter.

Figure 12A:
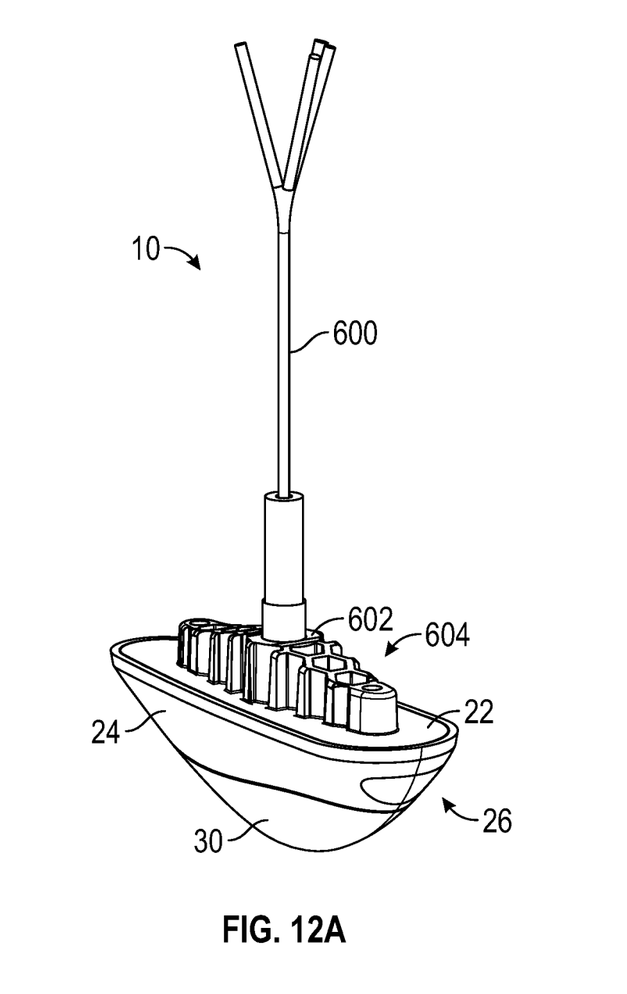
FIG. 12A is an elevation view of an example embodiment and FIG. 12B is a front elevation view of the example embodiment illustrated in FIG. 12A.
Figure 12B:
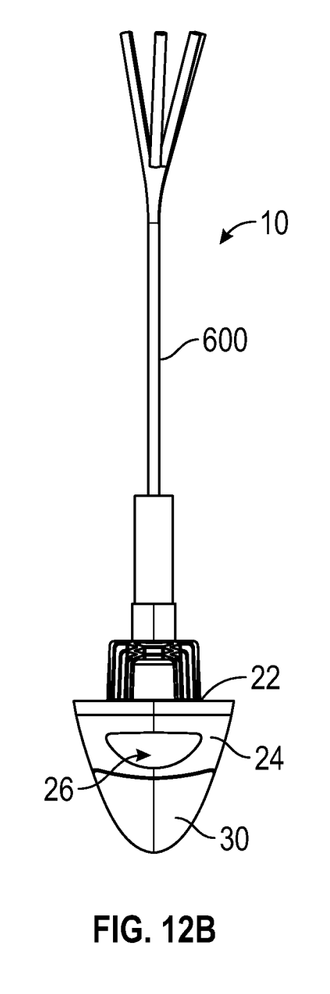

FIGS. 12*a* and 12*b* are elevation views of an example embodiment of the present apparatus 10 when fully assembled and ready for installation upon an aircraft. Base drain 22 upon base enables passage of wiring 600 to feed power to the plurality of LEDs 100 interior to the apparatus 10. The result is a lightweight anti-collision strobe usable on class I, II, and III aircraft that maximizes luminous intensity along required angles of observation at an equivalent lower luminous efficacy (lumens/watt) required of the light source.

What is claimed is:

1. An aircraft light collimation and redirection apparatus configured to signal the presence of an aircraft to an external observer, said aircraft light collimation and redirection apparatus comprising:
   a light source adapted to mount exteriorly upon the aircraft, said light source comprising a plurality of emitters;
   an optic configured to seat over the light source and enclose the plurality of emitters, said optic comprising:
      a plurality of collimators adapted to seat over the plurality of emitters wherein at least one emitter is disposed within each collimator; and
   a translucent lens cap configured to seat overtop the optic;
   wherein light emitted from the light source is collimated, focused, and reflected and/or refracted to direct and/or redirect the light within each said collimator to maximize luminous intensity at all statutorily required points of observation while minimizing the luminous efficacy required to be output by each emitter.

2. The aircraft light collimation and redirection apparatus of claim 1 further comprising:
   a base upon which the plurality of emitters is disposed;
   wherein the translucent lens cap is configured to securably fasten to the base.

3. The aircraft light collimation and redirection apparatus of claim 2 further comprising:

a heat sink base drain disposed upon an underside of the base to conduct heat away from the plurality of emitters; and a heat sink surrounding portion disposed surrounding a lower portion of the lens cap and connected to the base to conduct heat away from the plurality of emitters.

4. The aircraft light collimation and redirection apparatus of claim 3 wherein the lens cap comprises a lenticulate lens portion configured to focus and magnify light therethrough.

5. The aircraft light collimation and redirection apparatus of claim 4 wherein the plurality of collimators comprises:

a first collimator adapted to direct light in a first direction from the emitter along a steradian normal the light source;

a second collimator adapted to direct light in second direction along a steradian angled relative the first direction; and a third collimator adapted to direct light in a third direction along a steradian directed parallel to the light source, as well as in the first direction and in the second direction;

wherein light is collimated and directed through at least 90° in each of a coronal, transverse, and sagittal plane relative the aircraft.

6. The aircraft light collimation and redirection apparatus of claim 5 wherein the plurality of collimators further comprises:

a fourth collimator disposed as a mirror-image of the third collimator;

a fifth collimator disposed as a mirror-image of the second collimator; and a sixth collimator disposed as mirror image of the first collimator;

wherein light is collimated and directed through at least 90° in an opposite direction within the coronal, transverse, and sagittal planes of claim 5.

7. An aircraft light collimation and redirection apparatus configured to signal the presence of an aircraft to an external observer, said aircraft light collimation and redirection apparatus comprising:

a light source adapted to mount exteriorly upon the aircraft, said light source comprising a plurality of emitters disposed upon a base;

an optic configured to seat over the light source and enclose the plurality of emitters, said optic comprising:
a plurality of collimators adapted to seat over the plurality of emitters wherein at least one emitter is disposed within each collimator;
a lens cap having a lenticulate lens portion to focus and magnify light emitted thereunder; and
a heat sink;

wherein light emitted from the light source is collimated, focused, and reflected and/or refracted to direct and/or redirect the light within each said collimator to maximize luminous intensity at all statutorily required points of observation while minimizing the luminous efficacy required to be output by each emitter.

8. The aircraft light collimation and redirection apparatus of claim 7 wherein the plurality of collimators comprises:

a first collimator configured to direct light in a first direction from the emitter along a steradian normal the light source;

a second collimator configured to direct light in second direction along a steradian angled relative the first direction; and a third collimator configured to direct light in a third direction along a steradian directed parallel to the light source, as well as in the first direction and in the second direction;

wherein light is collimated and directed through at least 90° in each of a coronal, transverse, and sagittal plane relative the aircraft.

9. The aircraft light collimation and redirection apparatus of claim 8 wherein the plurality of collimators further comprises:

a fourth collimator disposed as a mirror-image of the third collimator;

a fifth collimator disposed as a mirror-image of the second collimator; and a sixth collimator disposed as mirror image of the first collimator;

wherein light is collimated and directed through at least 90° in an opposite direction within the coronal, transverse, and sagittal planes of claim 8.

10. The aircraft light collimation and redirection apparatus of claim 9 wherein the heat sink comprises a base drain disposed upon an underside of the base, said base drain configured to conduct heat away from the plurality of emitters.

11. The aircraft light collimation and redirection apparatus of claim 10 wherein the heat sink comprises a surrounding portion disposed surrounding a lower portion of the lens cap, said surrounding portion configured to conduct heat away from the plurality of emitters.

12. The aircraft light collimation and redirection apparatus of claim 11 wherein the surrounding portion is further configured to reflect light back into the optic for emission through each of the plurality of collimators.

13. The aircraft light collimation and redirection apparatus of claim 12 wherein the surrounding portion is further comprises an anterior aperture and a posterior aperture to enable emission of light from aircraft position lights therethrough.

14. In an optic for use in aircraft anti-collision strobe lighting systems, a method of redirecting emitted light through an optic that amplifies light along particular steradians to meet or exceed required luminous intensity standards for aircraft anti-collision strobe systems at all required angles of observation while minimizing the amount of power needed to produce the said intensity, said method comprising:

creating an optic comprising a plurality of collimators, each said collimator having at least one lenticle disposed therein, each said lenticle specifically adapted to reflect and/or refract light along pathways that collimate the light along at least one particular steradian;

fitting the optic overtop of a plurality of emitters such that each of the plurality of emitters is disposed interior to at an associated collimator disposed comprising the optic; and fitting a translucent lens cap over the optic;

wherein each collimator focuses and collimates emitted light along at least one particular steradian to increase the luminous energy density and perceived luminance along the said particular steradian, without increasing the luminous efficacy required by the emitter to meet the said intensity; and wherein light is collimated within particular steradians in each of a coronal, transverse, and sagittal plane relative the aircraft to meet or exceed standards for aviation safety.

* * * * *